United States Patent
Kobayashi

(10) Patent No.: US 10,911,159 B2
(45) Date of Patent: Feb. 2, 2021

(54) COMMUNICATION UNIT AND COMMUNICATION SYSTEM

(71) Applicant: SONY SEMICONDUCTOR SOLUTIONS CORPORATION, Kanagawa (JP)

(72) Inventor: Kenichi Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/330,251

(22) PCT Filed: Sep. 13, 2017

(86) PCT No.: PCT/JP2017/033072
§ 371 (c)(1),
(2) Date: Mar. 4, 2019

(87) PCT Pub. No.: WO2018/070175
PCT Pub. Date: Apr. 19, 2018

(65) Prior Publication Data
US 2019/0229816 A1 Jul. 25, 2019

(30) Foreign Application Priority Data
Oct. 13, 2016 (JP) ................. 2016-201750

(51) Int. Cl.
*H04B 13/00* (2006.01)
*H04L 5/00* (2006.01)
(Continued)

(52) U.S. Cl.
CPC ......... *H04B 13/005* (2013.01); *H04B 17/318* (2015.01); *H04L 5/0044* (2013.01); *H04J 2203/0091* (2013.01); *H04W 72/0446* (2013.01)

(58) Field of Classification Search
CPC .. H04B 13/005; H04B 17/318; H04B 17/309; H04L 5/0044; H04L 1/0023; H03G 3/005
See application file for complete search history.

(56) References Cited

U.S. PATENT DOCUMENTS 6,842,438 B1* 1/2005 Benedict ............... H04B 17/309
370/328
10,652,769 B2* 5/2020 Goldhamer .......... H04B 17/309
(Continued)

FOREIGN PATENT DOCUMENTS

CN 1507713 A 6/2004
CN 101604988 A 12/2009
(Continued)

OTHER PUBLICATIONS

International Search Report and Written Opinion of PCT Application No. PCT/JP2017/033072, dated Nov. 14, 2017, 09 pages of ISRWO.

*Primary Examiner* — Vinncelas Louis
(74) *Attorney, Agent, or Firm* — Chip Law Group

(57) ABSTRACT

A communication unit includes a communication circuit section that transmits transmission data to a communicated unit in each time-segment configured by a predetermined division number of time slots. The communication unit further includes a measuring section that, in a case where the time-segment includes a predetermined number or more of first time slots available for transmission of the transmission data and a predetermined number or less of second time slots not used for the transmission of the transmission data, measures a first signal value in a period of one or more of the first time slots and a second signal value in a period of one or more of the second time slots.

8 Claims, 11 Drawing Sheets

(51) Int. Cl.
*H04B 17/318* (2015.01)
*H04W 72/04* (2009.01)

(56) References Cited

U.S. PATENT DOCUMENTS

| | | | | |
|---|---|---|---|---|
| 2002/0160735 | A1* | 10/2002 | Fujii | H03G 3/005 |
| | | | | 455/246.1 |
| 2004/0004998 | A1 | 1/2004 | Fitton et al. | |
| 2009/0309708 | A1* | 12/2009 | Hasegawa | H04B 5/0012 |
| | | | | 340/286.01 |
| 2013/0235849 | A1* | 9/2013 | Ekici | H04L 1/0023 |
| | | | | 370/336 |

FOREIGN PATENT DOCUMENTS

| | | |
|---|---|---|
| EP | 1168690 A2 | 1/2002 |
| GB | 2385754 A | 8/2003 |
| JP | 2001-358637 A | 12/2001 |
| JP | 2002-044716 A | 2/2002 |
| JP | 2004-336470 A | 11/2004 |
| JP | 2005-518712 A | 6/2005 |
| JP | 2009-302895 A | 12/2009 |
| JP | 2012-213000 A | 11/2012 |
| JP | 2012-244470 A | 12/2012 |
| WO | 2003/071730 A1 | 8/2003 |

* cited by examiner

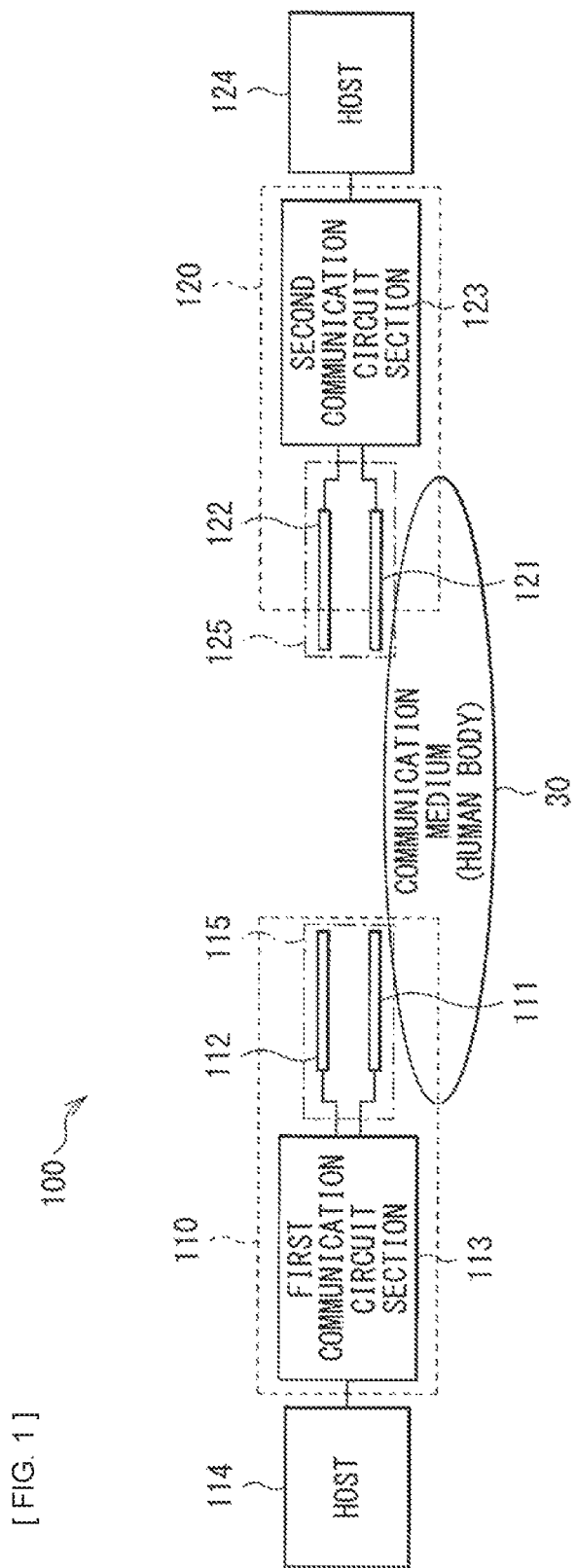
[FIG. 1]

[FIG. 2]
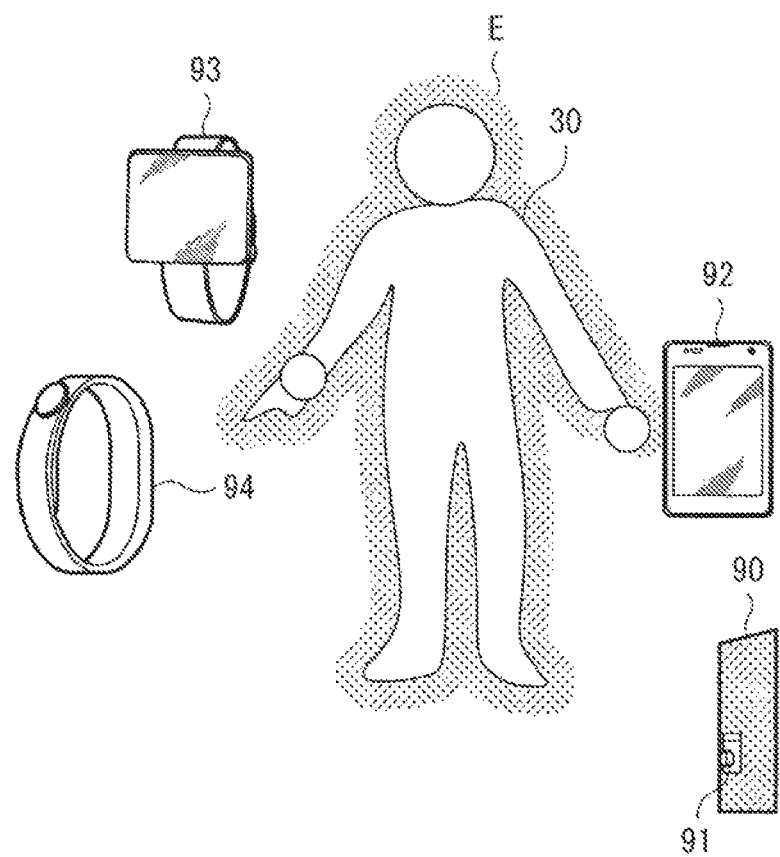

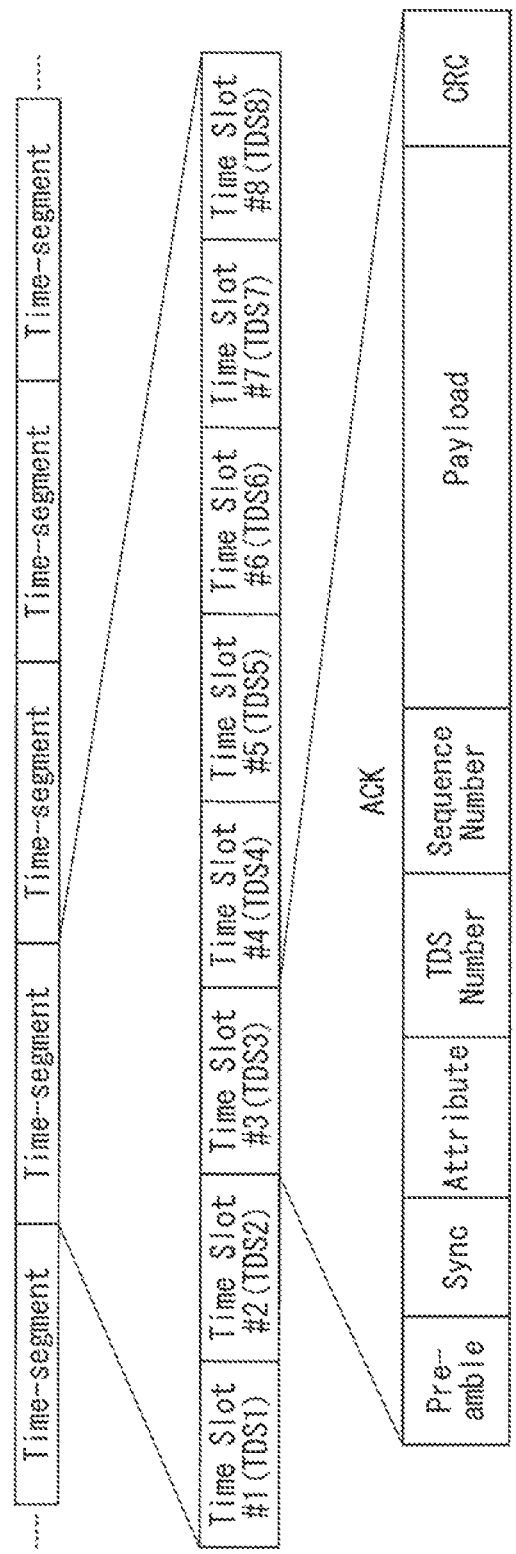
[FIG. 3]

[FIG. 4]
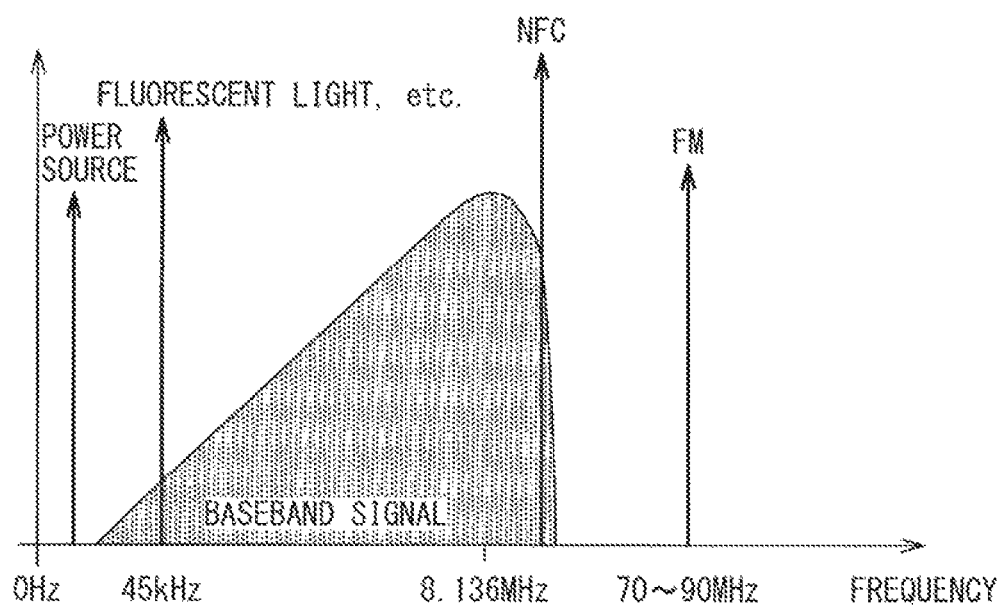

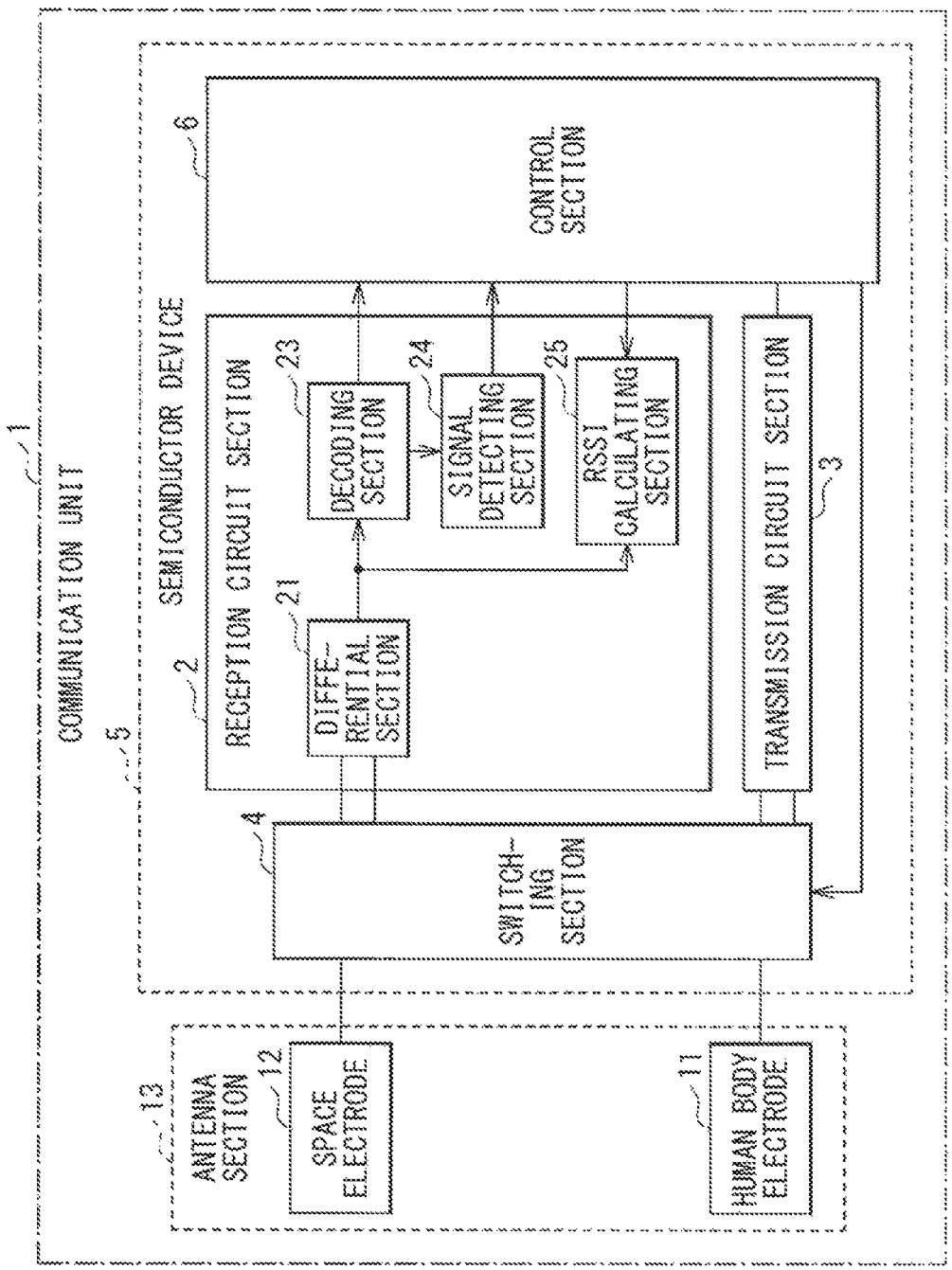
[FIG. 5]

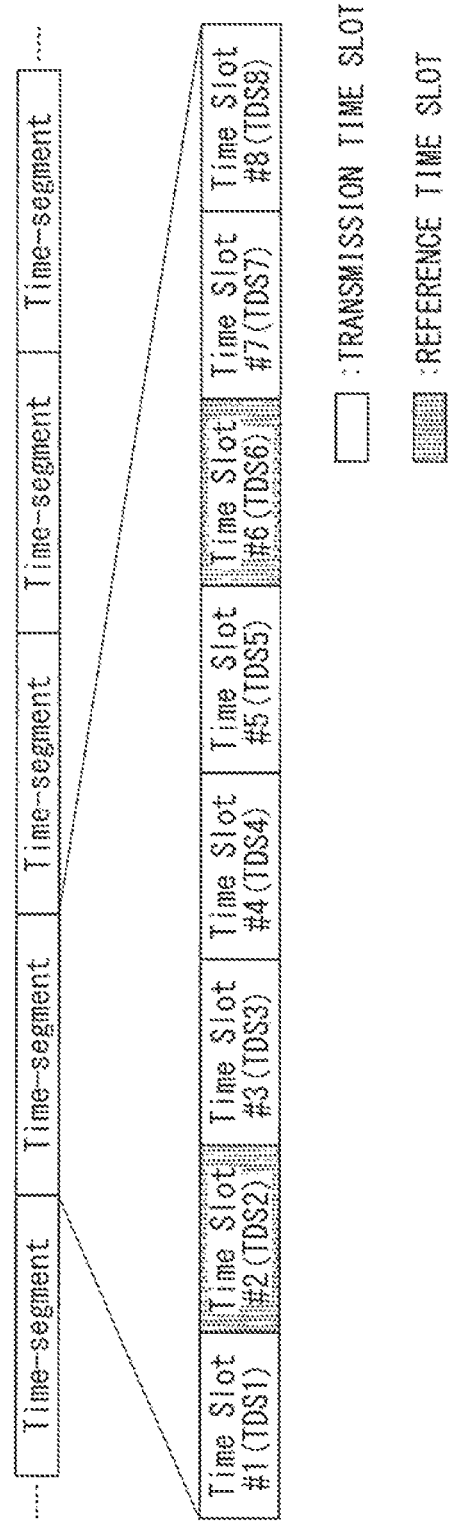

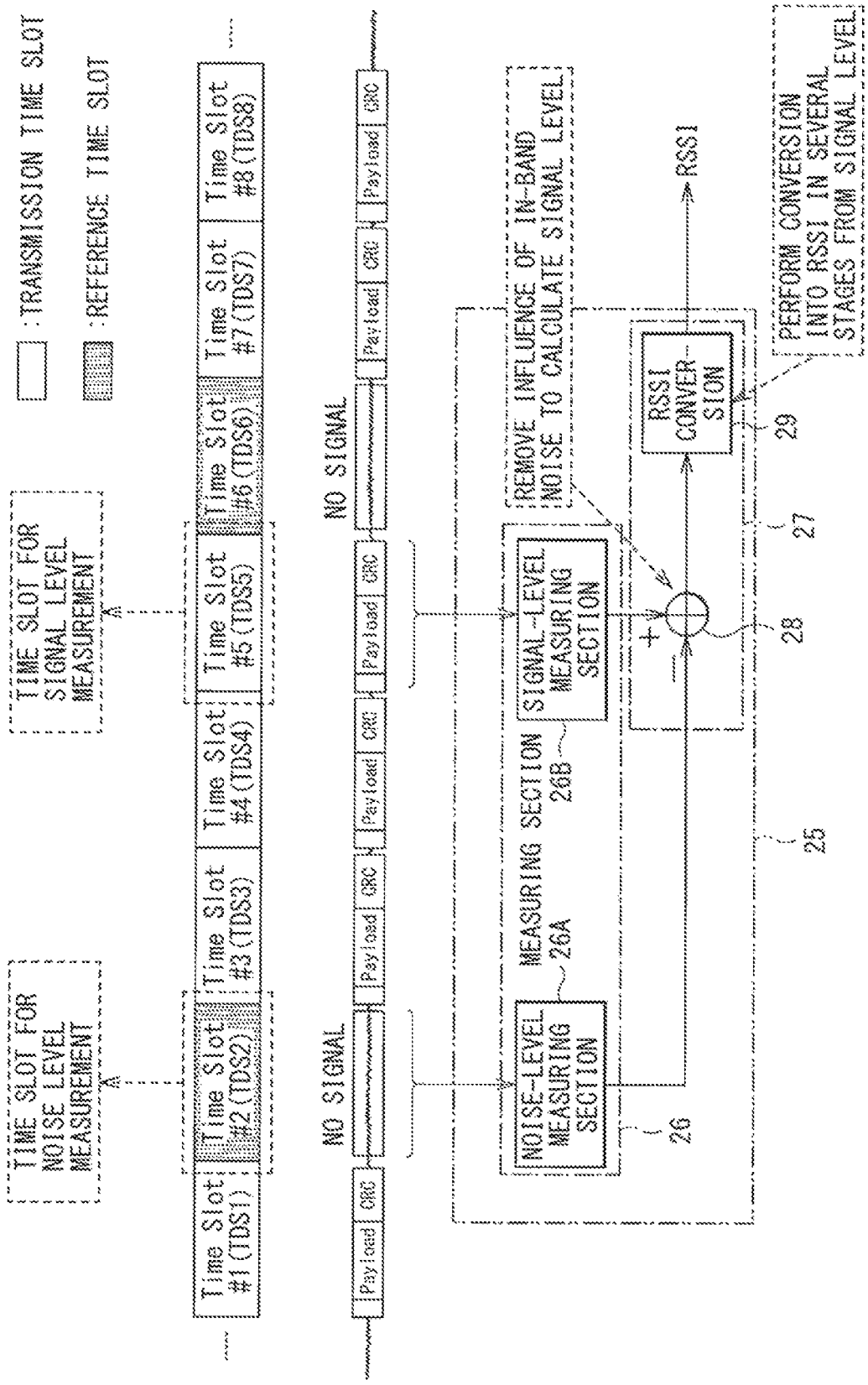

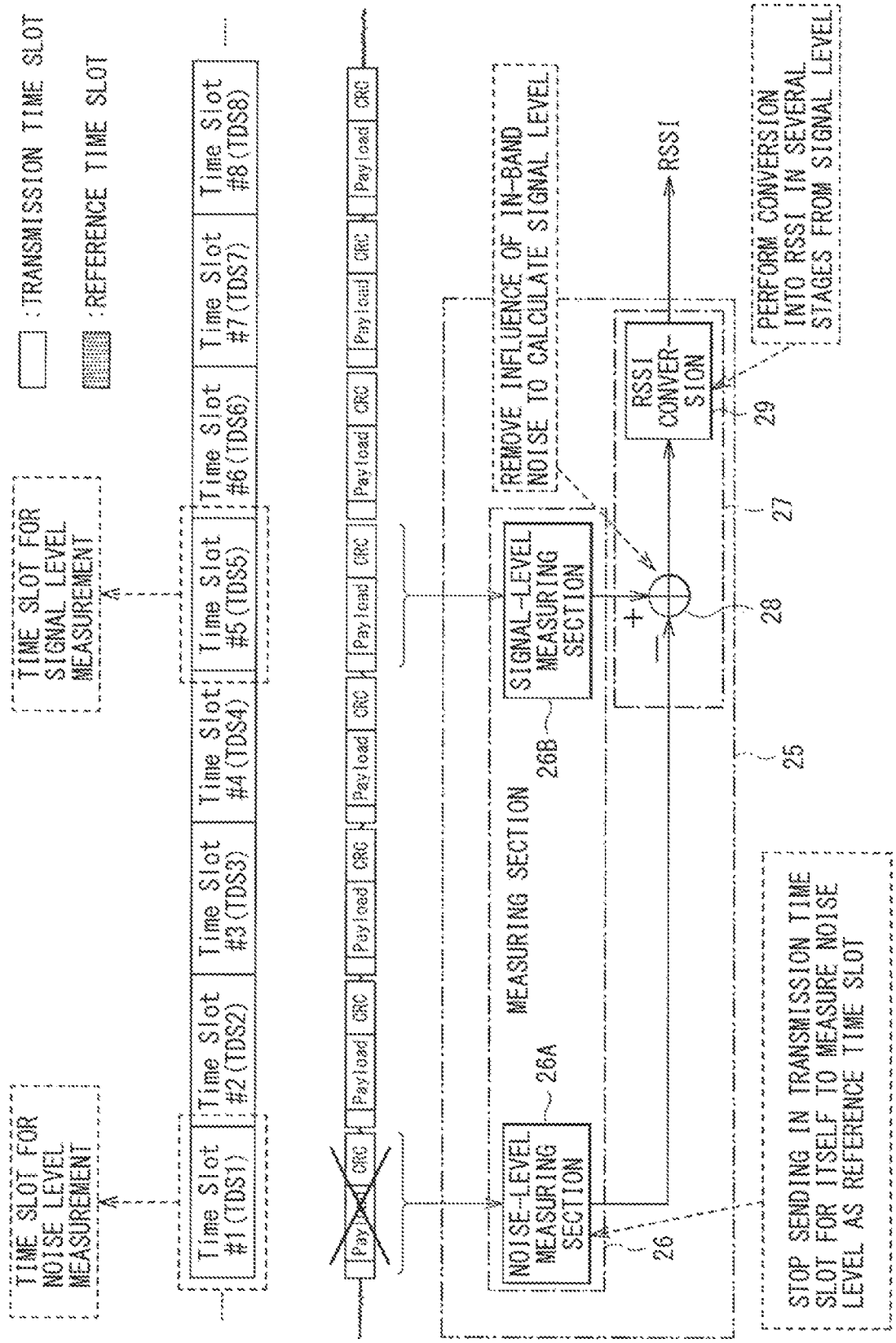

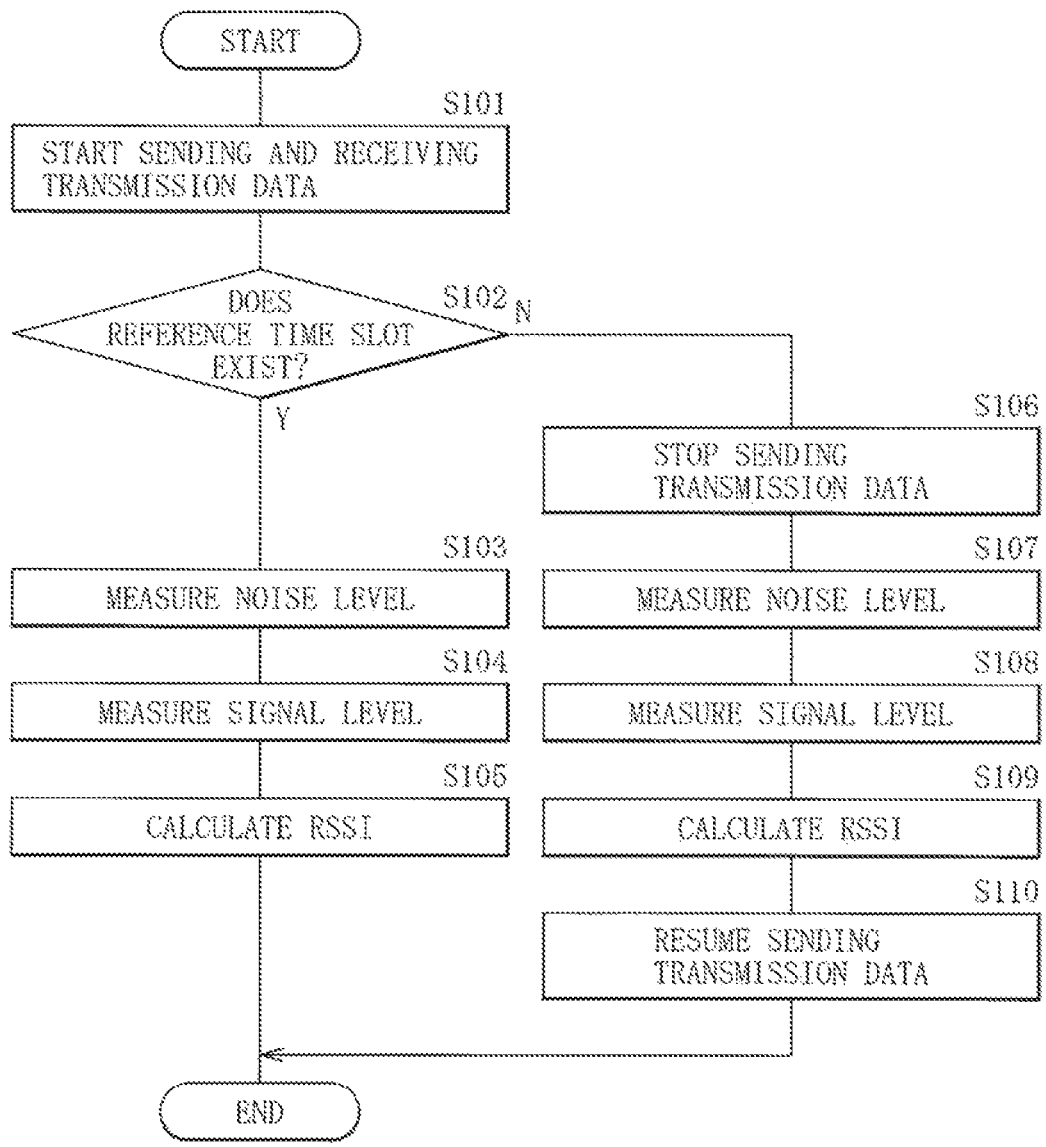
[FIG. 9]

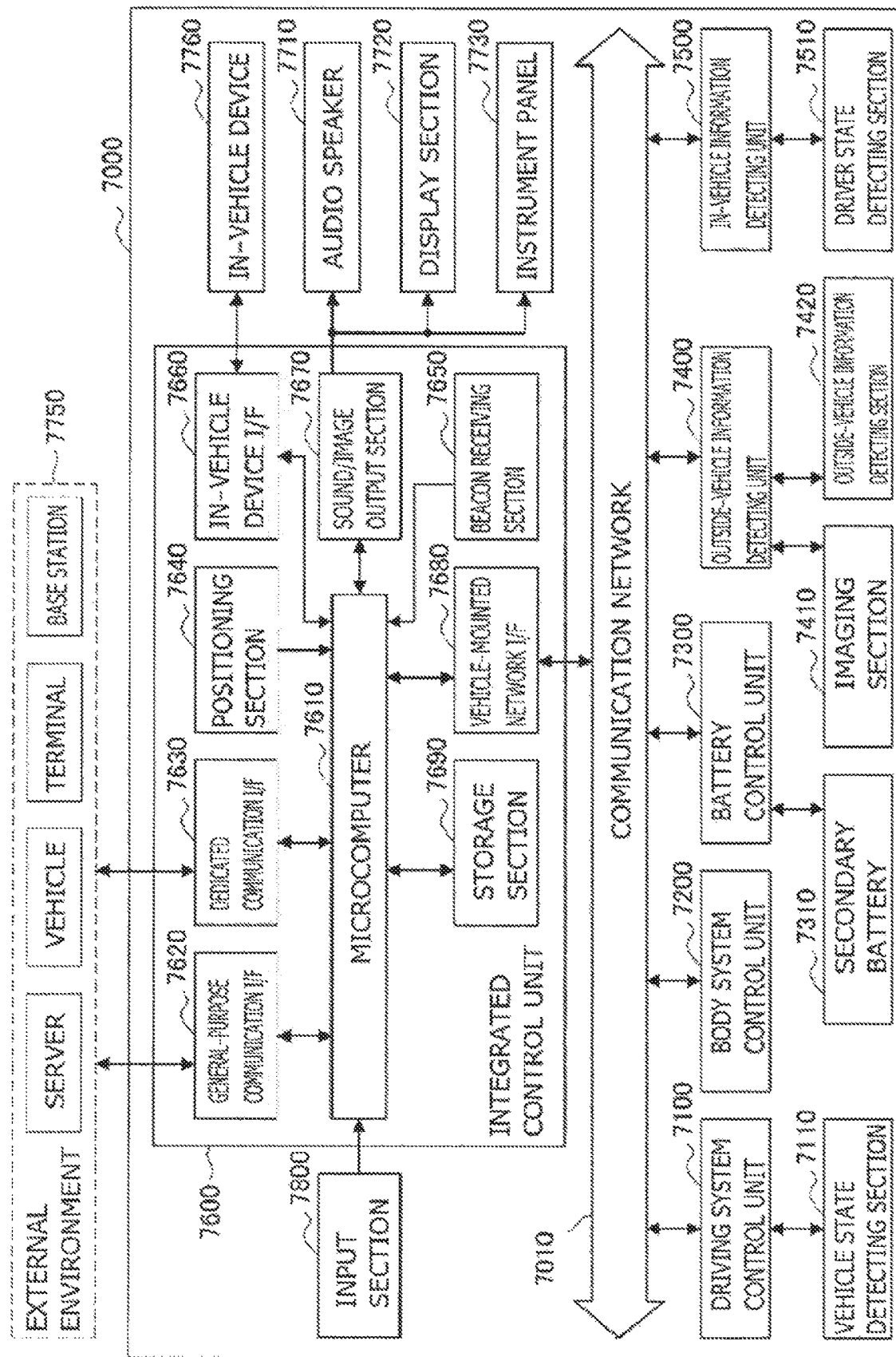
[FIG. 10]

[ FIG. 11 ]
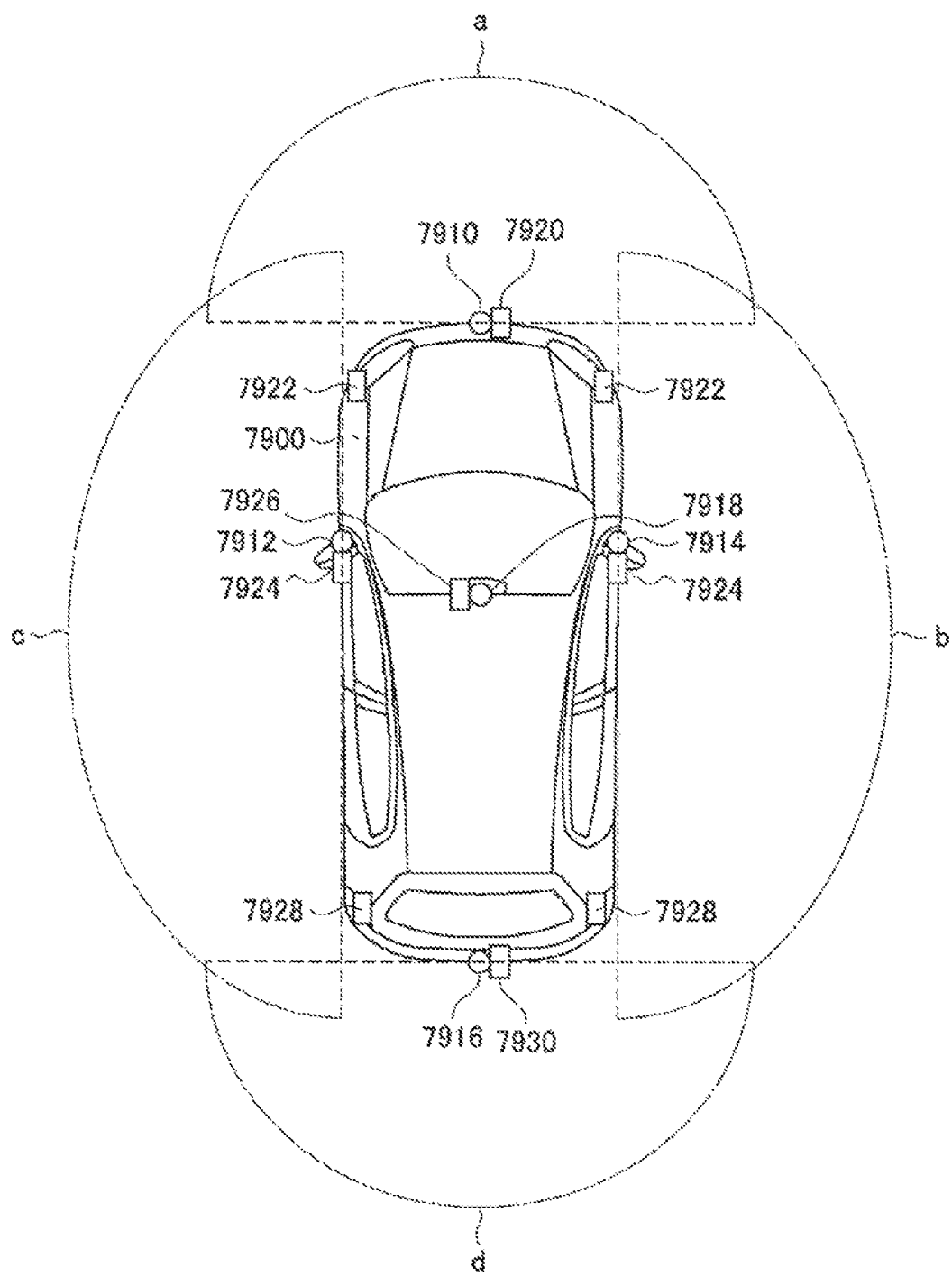

COMMUNICATION UNIT AND COMMUNICATION SYSTEM

CROSS REFERENCE TO RELATED APPLICATIONS

This application is a U.S. National Phase of International Patent Application No. PCT/JP2017/033072 filed on Sep. 13, 2017, which claims priority benefit of Japanese Patent Application No. JP 2016-201750 filed in the Japan Patent Office on Oct. 13, 2016. Each of the above-referenced applications is hereby incorporated herein by reference in its entirety.

TECHNICAL FIELD

The present disclosure relates to a communication unit and a communication system that are suitable for communication using a human body as a communication medium.

BACKGROUND ART

There is known a communication system that utilizes an electric field communication technique using, for example, a human body as a communication medium.

CITATION LIST

Patent Literatures

PTL 1: Japanese Unexamined Patent Application Publication No. 2004-336470
PTL 2: Japanese Unexamined Patent Application Publication No. 2012-244470

SUMMARY OF THE INVENTION

In a communication system utilizing an electric field communication technique, there may be a need to calculate a received signal strength indicator (RSSI).

It is desirable to provide a communication unit and a communication system that make it possible to calculate a received signal strength indicator less influenced by noise.

A communication unit according to an embodiment of the present disclosure includes: a communication circuit section that transmits transmission data to a communicated unit in each time-segment configured by a predetermined division number of time slots; and a measuring section that, in a case where the time-segment includes a predetermined number or more of first time slots available for transmission of the transmission data and a predetermined number or less of second time slots not used for the transmission of the transmission data, measures a first signal value in a period of one or more of the first time slots and a second signal value in a period of one or more of the second time slots.

A communication system according to an embodiment of the present disclosure includes a first communication unit and a second communication unit that transmits transmission data to the first communication unit. One or both of the first communication unit and the second communication unit include a communication circuit section that transmits the transmission data in each time-segment configured by a predetermined division number of time slots, and a measuring section that, in a case where the time-segment includes a predetermined number or more of first time slots available for transmission of the transmission data and a predetermined number or less of second time slots not used for the transmission of the transmission data, measures a first signal value in a period of one or more of the first time slots and a second signal value in a period of one or more of the second time slots.

In the communication unit or the communication system according to the embodiment of the present disclosure, the first signal value in a period of a first time slot available for the transmission of the transmission data and the second signal value in a period of a second time slot not used for the transmission of the transmission data are measured.

According to the communication unit or the communication system of the embodiment of the present disclosure, the first signal value in a period of the first time slot available for the transmission of the transmission data and the second signal value in a period of the second time slot not used for transmission of the transmission data are measured. This makes it possible to calculate a received signal strength indicator less influenced by noise.

It is to be noted that the effects described here are not necessarily limitative, and may be any of effects described in the present disclosure.

BRIEF DESCRIPTION OF DRAWINGS

FIG. 1 is a configuration diagram illustrating an outline of a communication system according to Comparative Example using a human body as a communication medium.

FIG. 2 is an explanatory diagram illustrating the outline of the communication system according to Comparative Example.

FIG. 3 is an explanatory diagram illustrating an example of a transmission format in the communication system according to Comparative Example.

FIG. 4 is an explanatory diagram illustrating an example of a signal band in the communication system according to Comparative Example.

FIG. 5 is a block diagram schematically illustrating a configuration example of a communication unit according to a first embodiment of the present disclosure.

FIG. 6 is an explanatory diagram illustrating an example of a transmission format used in the communication unit according to the first embodiment.

FIG. 7 is an explanatory diagram schematically illustrating an example of an RSSI calculation method performed by an RSSI calculating section in a case where a reference time slot exists.

FIG. 8 is an explanatory diagram schematically illustrating an example of an RSSI calculation method performed by the RSSI calculating section in a case where no reference time slot exists.

FIG. 9 is a flowchart schematically illustrating an example of a control flow about control of RSSI calculation performed by the communication unit according to the first embodiment.

FIG. 10 is a block diagram depicting an example of schematic configuration of a vehicle control system.

FIG. 11 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. It is to be noted that description is given in the following order.

0. Comparative Example (Outline and Issue of Communication System Using Human Body as Communication Medium) (FIGS. 1 to 4)
1. First Embodiment
　　1.1 Configuration (FIGS. 5 and 6)
　　1.2 Operation (FIGS. 7 to 9)
　　1.3 Effects
2. Second Embodiment (Application Example) (FIGS. 10 and 11)
3. Other Embodiments

0. Comparative Example (Outline of Communication System Using Human Body as Communication Medium)

FIGS. 1 and 2 each illustrate an outline of a communication system according to Comparative Example that utilizes an electric field communication technique and uses a human body 30 as a communication medium.

A communication system 100 according to this Comparative Example includes a first communication unit 110 and a second communication unit 120.

The communication system 100 may be utilized for communication between a communication apparatus mounted on a wearable apparatus such as a smart watch 93 and a wristband terminal 94, and a communication apparatus mounted on a doorknob 91 of a door 90, a smartphone 92, etc., as illustrated in, for example, FIG. 2. For example, one of the first communication unit 110 and the second communication unit 120 may be provided at the smart watch 93, etc., and the other may be provided at the smartphone 92, etc. Further, the communication system 100 may be utilized for unlocking, etc. of automobile doors. For example, one of the first communication unit 110 and the second communication unit 120 may be installed in automobile doors. Furthermore, the communication system 100 may also be used for unlocking, etc. of the door 90 with a locking function used for room entry and exit, besides the automobile doors.

The first communication unit 110 includes a first antenna section 115 and a first communication circuit section 113. The first antenna section 115 includes, as communication electrodes, a first human body electrode 111 and a first space electrode 112. The first communication circuit section 113 is coupled to a host 114.

The second communication unit 120 includes a second antenna section 125 and a second communication circuit section 123. The second antenna section 125 includes, as communication electrodes, a second human body electrode 121 and a second space electrode 122. The second communication circuit section 123 is coupled to a host 124.

The first communication circuit section 113 and the second communication circuit section 123 each include a communication circuit employing an electric field communication method (a quasi-electrostatic field communication method).

The first communication circuit section 113 may include at least a transmission circuit (a transmitter). The second communication circuit section 123 may include at least a reception circuit (a receiver). Further, the first communication circuit section 113 and the second communication circuit section 123 may each include a transmitter-receiver circuit, and bidirectional communication may be possible between the first communication unit 110 and the second communication unit 120.

In a case where a signal is sent from the first communication unit 110, the first communication circuit section 113 generates a sending signal of a potential difference including a signal modulated by a predetermined modulation system, between the first human body electrode 111 and the first space electrode 112. The first human body electrode 111 is disposed on side closer to the human body 30 than the first space electrode 112. The first human body electrode 111 is thereby disposed to have stronger capacitive coupling to the communication medium (the human body 30) than the first space electrode 112.

In this communication system, by bringing a portion of the human body 30 closer to the second human body electrode 121 than to the second space electrode 122, a human-body-side communication path that uses the human body 30 as a communication medium is formed between the first human body electrode 111 and the second human body electrode 121. In addition, a space-side communication path that uses a space (e.g., air) as a communication medium is formed between the first space electrode 112 and the second space electrode 122.

A potential difference corresponding to a sending signal transmitted through the human-body-side communication path and the space-side communication path is generated between the second human body electrode 121 and the second space electrode 122. The second communication circuit section 123 detects the potential difference generated between the second human body electrode 121 and the second space electrode 122, performs demodulation processing corresponding to the modulation system of the first communication circuit section 113 to generate a reception signal, and outputs the reception signal as an output signal.

In the electric field communication method (the quasi-electrostatic field communication method), strong coupling between the human body electrodes enables the first communication unit 110 and the second communication unit 120 to perform communication therebetween. The first communication unit 110 and the second communication unit 120 are able to perform communication when a person comes into contact with the human body electrodes; however, even when the person comes close to the human body electrodes, an electric field E is distributed over a surface of the human body as illustrated in FIG. 2, which enables the communication to be performed. Accordingly, the communication is possible only in the immediate vicinity of the human body 30. This method is also highly compatible with a wearable device.

(A Transmission Format)

Examples of a standard of the electric field communication as described above include ISO/IEC 17982 CCCC PHY (Closed Capacitive Coupling Communication Physical Layer). The ISO/IEC 17982 CCCC PHY (hereinafter referred to as CCCC-PHY) adopts automatic retransmission control (ARQ; Automatic Repeat reQuest) using an error detecting code and retransmission control.

FIG. 3 illustrates an example of a transmission format according to the CCCC-PHY standards.

In the CCCC-PHY standards, transmission data are transmitted between a communicated unit (for example, the first communication unit 110) and a communication unit (for example, the second communication unit 120), in each time-segment having a predetermined interval. One time-segment is configured by a predetermined division number of time slots (time division slot (TDS)).

For example, transmission data divided into head data and one or more of subsequent data are sent from the communicated unit. The communication unit receives the transmission data from the communicated unit over a period of a plurality of time-segments. The transmission data from the communicated unit is transmitted in a period of one time slot of a plurality of time slots, in each of the plurality of time-segments. In a case where there exist a plurality of communicated units or a plurality of communication units, different time slots are assigned to the respective units within one time-segment. The time slots are assigned by the communicated unit or the communication unit that is the first unit to start the communication.

The transmission data transmitted in a period of one time slot is packet data. The packet data includes Pre-amble, Sync data, Attribute data, a TDS Number, and a Sequence Number (a number for retransmission). Furthermore, the packet data includes Payload, which is real data of the transmission data, and a cyclic redundancy check (CRC) as an error detection code.

The communication unit identifies a time slot of the communicated unit on the basis of a result of CRC decoding of the received transmission data. The communication unit determines whether or not it is a communication terminal that the communication unit itself desires to communicate with on the basis of a Payload portion of the transmission data of which the CRC decoding has been performed successfully. The communication unit transmits data using a time slot assigned by the communicated unit. For example, in a case where the communication unit receives transmission data from the communicated unit, the communication unit sends, back to the communicated unit, acknowledgment (ACK) indicating that the transmission data has been normally received within a period of the same time-segment as the time-segment in which the received transmission data has been transmitted. In this case, the communication unit transmits incremented Sequence Number of the communicated unit as a Sequence Number of transmission data to be sent back.

(Issue)

In a communication system of the CCCC-PHY standards as described above, there is a need to communicate with a closer terminal in terms of security, and thus it may be required to implement an RSSI (received signal strength indicator) as an indicator thereof. In a communication system based on another communication standard that is different from CCCC-PHY, there is a method of calculation in an RSSI calculation section predefined in a frame format as an RSSI calculation method. Further, in the communication system based on the other communication standard, there is a method of calculating an RSSI by measuring a noise level using a section in which no signal is sent, such as a section between a signal reception section and a transmission section and by cancelling the noise level from a signal level measured in the reception section.

However, neither definite RSSI calculation section nor a calculation method thereof is defined in CCCC-PHY. As illustrated in FIG. 4, CCCC-PHY involves baseband transmission using a baseband signal having a wideband signal band, and the influence of noise in a transmission band is not negligible. For example, a power source, a fluorescent light, etc. may become noise. Further, a signal of wireless communication, such as a near field communication (NFC), may become noise. Accordingly, in a case where RSSI calculation is performed in a communication system based on the CCCC-PHY standards, it may be necessary to eliminate the influence of the noise level. Further, in the communication system based on the CCCC-PHY standards, by increasing the number of communicated units or communication units, all of a plurality of time slots in one time-segment may be occupied by a plurality of communicated units or a plurality of communication units, and it may not be possible to provide a noise level measurement section.

From those described above, it is desired to develop a technique that makes it possible to calculate an RSSI less influenced by noise in a communication unit or communication system based on the CCCC-PHY standards.

1. First Embodiment

[1.1 Configuration]

FIG. 5 schematically illustrates a configuration example of a communication unit 1 according to a first embodiment of the present disclosure.

The communication unit 1 according to the present embodiment may be applied to one or both of the first communication unit 110 and the second communication unit 120 in the communication system 100 according to Comparative Example described above. In this case, the first communication unit 110 and the second communication unit 120 may be a transmitter-receiver that transmits and receives data bidirectionally. For example, the communicated unit that communicates with the communication unit 1 according to the present embodiment may be set as the first communication unit 110, and the communication unit 1 according to the present embodiment may be set as the second communication unit 120.

The communication unit 1 according to the present embodiment is able to perform communication in the above-described transmission format based on the CCCC-PHY standards illustrated in FIG. 3. Further, the communication unit 1 is able to perform communication in a transmission format illustrated in FIG. 6.

In the transmission format illustrated in FIG. 6, one time-segment includes a predetermined number or more of first time slots (transmission time slots) available for transmission of transmission data and the predetermined number or less of second time slots (reference time slots) not used for transmission of transmission data.

The number of transmission time slots in one time-segment is desirably half or more of a predetermined division number of one time-segment (in an example of FIG. 6, eight). Further, the number of reference time slots is desirably half or less of the predetermined division number of one time-segment. The example of FIG. 6 gives a case where the number of reference time slots is set to two, and the number of transmission time slots is set to six; however, the respective numbers of time slots are not limited to this example. Moreover, as illustrated in FIG. 8 described later, it is also possible to set the number of reference time slots to zero. One or more of the reference time slots are used as a time slot for noise level measurement as illustrated in FIG. 7 described later. One or more of the transmission time slots are used as a time slot for signal level measurement as illustrated in FIG. 7 described later.

The other format portions of the transmission format illustrated in FIG. 6 may be substantially similar to the transmission format illustrated in FIG. 3.

The communication unit 1 according to the present embodiment includes an antenna section 13, a reception circuit section 2 that receives reception data from the communicated unit through the antenna section 13, and a transmission circuit section 3 that sends sending data to the communicated unit through the antenna section. Further, the communication unit 1 includes a switching section 4 provided between the antenna section 13 and the reception and transmission circuit sections 2 and 3, and a control section 6 that controls the switching section 4, the reception circuit section 2, and the transmission circuit section 3.

The antenna section 13 corresponds to, for example, the above-described second antenna section 125 of the second communication unit 120 in FIG. 1. The antenna section 13 includes a human body electrode 11 as a first electrode and a space electrode 12 as a second electrode. The human body electrode 11 corresponds to, for example, the above-described second human body electrode 121 of the second communication unit 120 in FIG. 1. The space electrode 12 corresponds to, for example, the above-described second space electrode 122 of the second communication unit 120 in FIG. 1.

The reception circuit section 2, the transmission circuit section 3, the switching section 4, and the control section 6 may be provided in one semiconductor device (an integrated circuit (IC)) 5.

The reception circuit section 2 and the transmission circuit section 3 are each a communication circuit section that transmits transmission data to the communicated unit in each time-segment configured by a predetermined division number of time slots.

The reception circuit section 2 includes a differential section 21, a decoding section 23, a signal detecting section 24, and an RSSI calculating section 25.

Reception data of a differential signal is inputted to the differential section 21 through the human body electrode 11 and the space electrode 12.

The switching section 4 is able to switch electrical coupling relationships between the antenna section 13 and the reception circuit section 2 and between the antenna section 13 and the transmission circuit section 3. The switching section 4 is coupled to the differential section 21, and is able to switch the electrical coupling relationship between the antenna section 13 and the reception circuit section 2 through the differential section 21.

The control section 6 controls the switching section 4 to cause the antenna section 13 and the reception circuit section 2 to be electrically coupled to each other in a case where the reception circuit section 2 receives reception data from the communicated unit.

The control section 6 controls the switching section 4 to cause the antenna section 13 and the transmission circuit section 3 to be electrically coupled to each other in a case where the transmission circuit section 3 sends sending data to the communicated unit.

In the CCCC-PHY standards, it is possible to detect whether or not it is a time slot in which transmission data from the communicated unit has been stored, on the basis of whether or not CRC decoding of the received transmission data has been performed successfully. The signal detecting section 24 detects whether the current time slot is a transmission time slot or a reference time slot, on the basis of a result of decoding of the transmission data in the decoding section 23.

The control section 6 determines a time slot for noise level measurement and a time slot for signal level measurement on the basis of a detection result from the signal detecting section 24, as illustrated in FIG. 7 described later.

The RSSI calculating section 25 calculates an RSSI by cancelling a noise level measured in the time slot for noise level measurement from a signal level measured in the time slot for signal level measurement.

The RSSI calculating section 25 includes a measuring section 26 and a signal-value calculating section 27 as illustrated in FIG. 7 described later. The measuring section 26 includes a noise-level measuring section 26A and a signal-level measuring section 26B as illustrated in FIG. 7 described later. The signal-value calculating section 27 includes a difference calculator 28 and an RSSI converter 29 as illustrated in FIG. 7 described later.

In a case where a time-segment includes transmission time slots and reference time slots as illustrated in FIG. 7 described later, the measuring section 26 measures a first signal value (a signal level) in one or more of the transmission time slots and a second signal value (a signal level) in one or more of the reference time slots.

The signal-value calculating section 27 calculates a signal value (RSSI) concerning a received voltage or received power on the basis of the first signal value (the signal level) and the second signal value (the noise level). The signal-value calculating section 27 calculates the signal value concerning the received voltage or the received power on the basis of the first signal value minus the second signal value.

In a case where a time-segment does not include any reference time slot and includes a plurality of transmission time slots as illustrated in FIG. 8 described later, the control section 6 considers one time slot, of the plurality of transmission time slots, as a reference time slot and controls the transmission circuit section 3 so as not to use the one time slot for transmission of the transmission data.

[1.2 Operation]

FIG. 7 schematically illustrates an example of an RSSI calculation method performed by the RSSI calculating section 25 in a case where a reference time slot exists. FIG. 8 schematically illustrates an example of an RSSI calculation method performed by the RSSI calculating section 25 in a case where no reference time slot exists.

In a case where the control section 6 determines that reference time slots exist in a time-segment as illustrated in FIG. 7 on the basis of a detection result from the signal detecting section 24, the control section 6 determines one or more of the reference time slots as a time slot for noise level measurement. Further, the control section 6 determines one or more of the transmission time slots as a time slot for signal level measurement on the basis of a detection result from the signal detecting section 24.

In a case where the control section 6 determines that no reference time slot exists in a time-segment as illustrated in FIG. 8 on the basis of a detection result from the signal detecting section 24, the control section 6 stops sending for a certain section in one time-segment, and considers one or more of the transmission time slots assigned to itself as a reference time slot and determines the time slot to be a time slot for noise level measurement.

In the measuring section 26, the noise-level measuring section 26A measures a noise level in a period of the time slot for noise level measurement. Further, in the measuring section 26, the signal-level measuring section 26B measures a signal level in a period of the time slot for signal level measurement.

The signal-value calculating section 27 calculates a signal value (RSSI) concerning a received voltage or received power on the basis of the measured signal and noise levels. The difference calculator 28 calculates a value obtained by subtracting the noise level from the signal level. Accordingly, a signal level with the influence of in-band noise being removed is calculated. The RSSI converter 29 calculates the signal value concerning the received voltage or the received power as an RSSI on the basis of a result of the calculation by the difference calculator 28. The RSSI may be, for example, values in several stages into which the signal value is converted. For example, RSSI may be values in three stages: high (strong), medium, and low (weak), into which the signal value is converted.

It is to be noted that the examples of FIGS. 7 and 8 each give a case of providing one time slot for noise level measurement and one time slot for signal level measurement; however, a plurality of time slots may be adopted for each of the measurements. For example, a plurality of time slots may be adopted for the noise level measurement, and measured noise levels may be averaged.

FIG. 9 illustrates an example of a control flow about control of RSSI calculation by the communication unit 1 according to the present embodiment.

In the communication unit 1, the reception circuit section 2 or the transmission circuit section 3 first start transmission and reception of transmission data (step S101). Next, in the communication unit 1, the signal detecting section 24 determines whether or not a reference time slot exists on the basis of a result of CRC decoding of the transmission data by the decoding section 23 (step S102).

In a case where it is determined that a reference time slot exists (step S102; Y), as illustrated above in FIG. 7, the control section 6 determines one or more of the reference time slots as a time slot for noise level measurement, and the measuring section 26 measures a noise level (step S103). Further, the control section 6 determines one or more of the transmission time slots as a time slot for signal level measurement, and the measuring section 26 measures a signal level (step S104). Thereafter, the signal-value calculating section 27 calculates an RSSI on the basis of the measured noise and signal levels (step S105).

Meanwhile, in a case where it is determined that no reference time slot exists (step S102; N), as illustrated above in FIG. 8, the control section 6 considers one or more of the transmission time slots assigned to itself as a reference time slot and determines the time slot to be a time slot for noise level measurement. Thereafter, the measuring section 26 measures a noise level in a period of the time slot for noise level measurement (step S107). Further, the control section 6 determines one or more of the transmission time slots to be a time slot for signal level measurement, and the measuring section 26 measures a signal level (step S108). Thereafter, the signal-value calculating section 27 calculates an RSSI on the basis of the measured noise and signal levels (step S109).

It is to be noted that, in the above description, a signal level is measured after measurement of a noise level; however, the noise level may be measured after measurement of the signal level.

[1.3 Effects]

As described above, according to the present embodiment, a first signal value in a period of a first time slot (a transmission time slot) available for transmission of transmission data and a second signal value in a period of a second time slot (a reference time slot) not used for transmission of the transmission data are measured; therefore, it is possible to calculate an RSSI less influenced by noise.

According to the present embodiment, it is possible to calculate an RSSI also in a communication method in which a plurality of time slots in a time-segment may be possibly occupied by a plurality of terminal devices as with a communication system based on the CCCC-PHY standards.

It is to be noted that the effects described herein are merely illustrative and not limitative, and may have other effects. The same holds true also for effects of other embodiments as described hereinbelow.

2. Second Embodiment (Application Example)

The technology according to an embodiment of the present disclosure is applicable to various products. For example, the technology according to an embodiment of the present disclosure may be achieved in the form of an apparatus to be mounted to a mobile body of any kind. Non-limiting examples of the mobile body may include an automobile, an electric vehicle, a hybrid electric vehicle, a motorcycle, a bicycle, any personal mobility device, an airplane, an unmanned aerial vehicle (drone), a vessel, a robot, a construction machine, and an agricultural machine (tractor).

It is to be noted that, in the following description, GSM and HDMI are each a registered trademark.

FIG. 10 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 10, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 10 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 11 depicts an example of installation positions of the imaging section 7410 and the outside-vehicle information detecting section 7420. Imaging sections 7910, 7912, 7914, 7916, and 7918 are, for example, disposed at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 11 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 10, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 10, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 10 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the communication unit and the communication system of the present disclosure are applicable to, for example, communication with the external environment 7750 such as a terminal present in the vicinity of the vehicle via the general-purpose communication I/F 7620. Further, the communication unit and the communication system are applicable to communication with the in-vehicle device 7760 such as a mobile device or a wearable device possessed by an occupant via the in-vehicle device I/F 7660.

3. Other Embodiments

The technique according to the present disclosure is not limited to the descriptions of the foregoing embodiments, and may be modified in a variety of ways.

For example, each component in the foregoing embodiments may be divided into a plurality of subcomponents, and the divided subcomponents may have different functions.

Moreover, for example, in the control flow in each of the foregoing embodiments, a control flow in which some of process steps are omitted may be executed. Moreover, a control flow in which another process step not described in the control flow is added may be executed. Further, a control flow in which the order of process steps defined in the control flow is partially changed may be executed.

For example, the present technology may have the following configurations.

(1)

A communication unit including:
a communication circuit section that transmits transmission data to a communicated unit in each time-segment configured by a predetermined division number of time slots; and
a measuring section that, in a case where the time-segment includes a predetermined number or more of first time slots available for transmission of the transmission data and a predetermined number or less of second time slots not used for the transmission of the transmission data, measures a first signal value in a period of one or more of the first time slots and a second signal value in a period of one or more of the second time slots.

(2)

The communication unit according to (1), further including a signal-value calculating section that calculates a signal value concerning a received voltage or received power on a basis of the first signal value and the second signal value.

(3)

The communication unit according to (2), in which the signal-value calculating section calculates the signal value concerning the received voltage or the received power on a basis of the first signal value minus the second signal value.

(4)

The communication unit according to any one of (1) to (3), further including a control section that, in a case where the time-segment does not include any of the second time slots and includes a plurality of the first time slots, considers one, of the plurality of the first time slots, as the second time slot and controls the communication circuit section so as not to use the one first time slot for transmission of the transmission data.

(5)

The communication unit according to any one of (1) to (4), in which
the number of the first time slots in the time-segment is equal to or more than half of the predetermined division number, and
the number of the second time slots in the time-segment is equal to or less than the half of the predetermined division number.

(6)

The communication unit according to any one of (1) to (5), further including an antenna section including a first electrode and a second electrode, in which
the communication circuit section performs communication using a human body as a communication medium through the antenna section.

(7)

A communication system including:
a first communication unit; and
a second communication unit that transmits transmission data to the first communication unit,
one or both of the first communication unit and the second communication unit including
a communication circuit section that transmits the transmission data in each time-segment configured by a predetermined division number of time slots, and
a measuring section that, in a case where the time-segment includes a predetermined number or more of first time slots available for transmission of the transmission data and a predetermined number or less of second time slots not used for the transmission of the transmission data, measures a first signal value in a period of one or more of the first time slots and a second signal value in a period of one or more of the second time slots.

(8)

The communication system according to (7), further including an antenna section including a first electrode and a second electrode, in which
the communication circuit section performs communication using a human body as a communication medium through the antenna section.

This application claims the benefit of Japanese Priority Patent Application JP2016-201750 filed with the Japan Patent Office on Oct. 13, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A first communication unit, comprising:
a communication circuit section configured to transmit transmission data to second communication unit in each time-segment of a plurality of time-segments, wherein
each time-segment, of the plurality of time-segments, comprises a specific number of time slots,
the specific number of time slots comprises:
a plurality of first time slots which are available for the transmission of the transmission data, and
a plurality of second time slots which are not used for the transmission of the transmission data,
the transmission data is transmitted as a potential difference signal between a human body electrode connected to a first communication path having a human body as a communication medium, and a space electrode connected to a second communication path having air as a communication medium; and
a measuring section configured to measure, when a first number of time slots of the plurality of first time slots in a time-segment of the plurality of time-segments, is one of greater than or equal to a first threshold number and a second number of time slots of the plurality of second time slots, in the time-segment, is one of less than or equal to a second threshold number:
a first signal value in a period of at least one time slot of the plurality of first time slots, and
a second signal value in a period of at least one time slot of the plurality of second time slots.

2. The first communication unit according to claim 1, further comprising a signal-value calculating section configured to calculate a signal value associated with one of a received voltage or a received power, based on the first signal value and the second signal value.

3. The first communication unit according to claim 2, wherein the signal-value calculating section is further configured to calculate the signal value associated with one of the received voltage or the received power, based on a difference between the first signal value and the second signal value.

4. The first communication unit according to claim 1, further comprising a control section configured to control the communication circuit section to, when the time segment does not include a time slot of the plurality of second time slots, prohibit use of one time slot, of the plurality of first time slots, for the transmission of the transmission data.

5. The first communication unit according to claim 1, wherein
the first threshold number is one of greater than or equal to half of the specific number of time slots, and
the second threshold number is one of less than or equal to the half of the specific number of time slots.

6. The first communication unit according to claim 1, further comprising an antenna section including a first electrode and a second electrode.

7. A communication system, comprising:
a first communication unit; and
a second communication unit configured to transmit transmission data to the first communication unit, wherein one of the first communication unit or the second communication unit comprises:
a communication circuit section configured to transmit the transmission data to other communication unit of the first communication unit or the second communication unit in each time-segment of a plurality of time-segments, wherein
each time-segment, of the plurality of time-segments, comprises a specific number of time slots, the specific number of time slots comprises:
a plurality of first time slots which are available for the transmission of the transmission data, and
a plurality of second time slots which are not used for the transmission of the transmission data,
the transmission data is transmitted as a potential difference signal between a human body electrode connected to a first communication path having a human body as a communication medium, and a space electrode connected to a second communication path having air as a communication medium; and
a measuring section configured to measure, when a first number of time slots of the plurality of first time slots in a time-segment of the plurality of time-segments, is one of greater than or equal to a first threshold number and a second number of time slots of the plurality of second time slots, in the time-segment, is one of less than or equal to a second threshold number:
a first signal value in a period of at least one time slot of the plurality of first time slots, and
a second signal value in a period of at least one time slot of the plurality of second time slots.

8. The communication system according to claim 7, wherein
the first threshold number is one of greater than or equal to half of the specific number of time slots, and
the second threshold number is one of less than or equal to the half of the specific number of time slots.

* * * * *